Nov. 17, 1964  C. E. MAKI  3,157,045
VIBRATION TESTING SYSTEM
Filed Aug. 15, 1960  3 Sheets-Sheet 1

INVENTOR
CHARLES E. MAKI
BY
Byerly, Townsend, Watson & Churchill
ATTORNEYS.

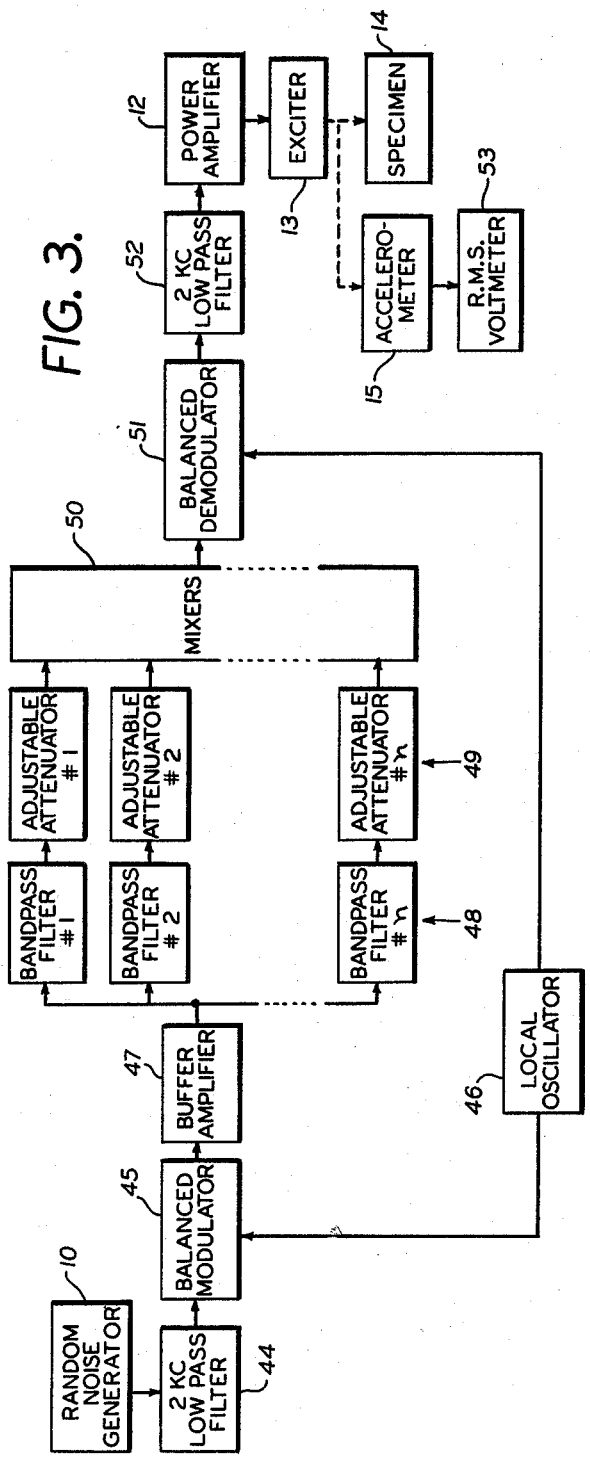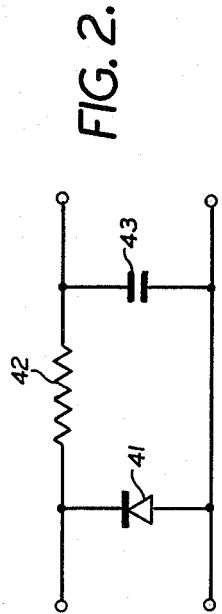

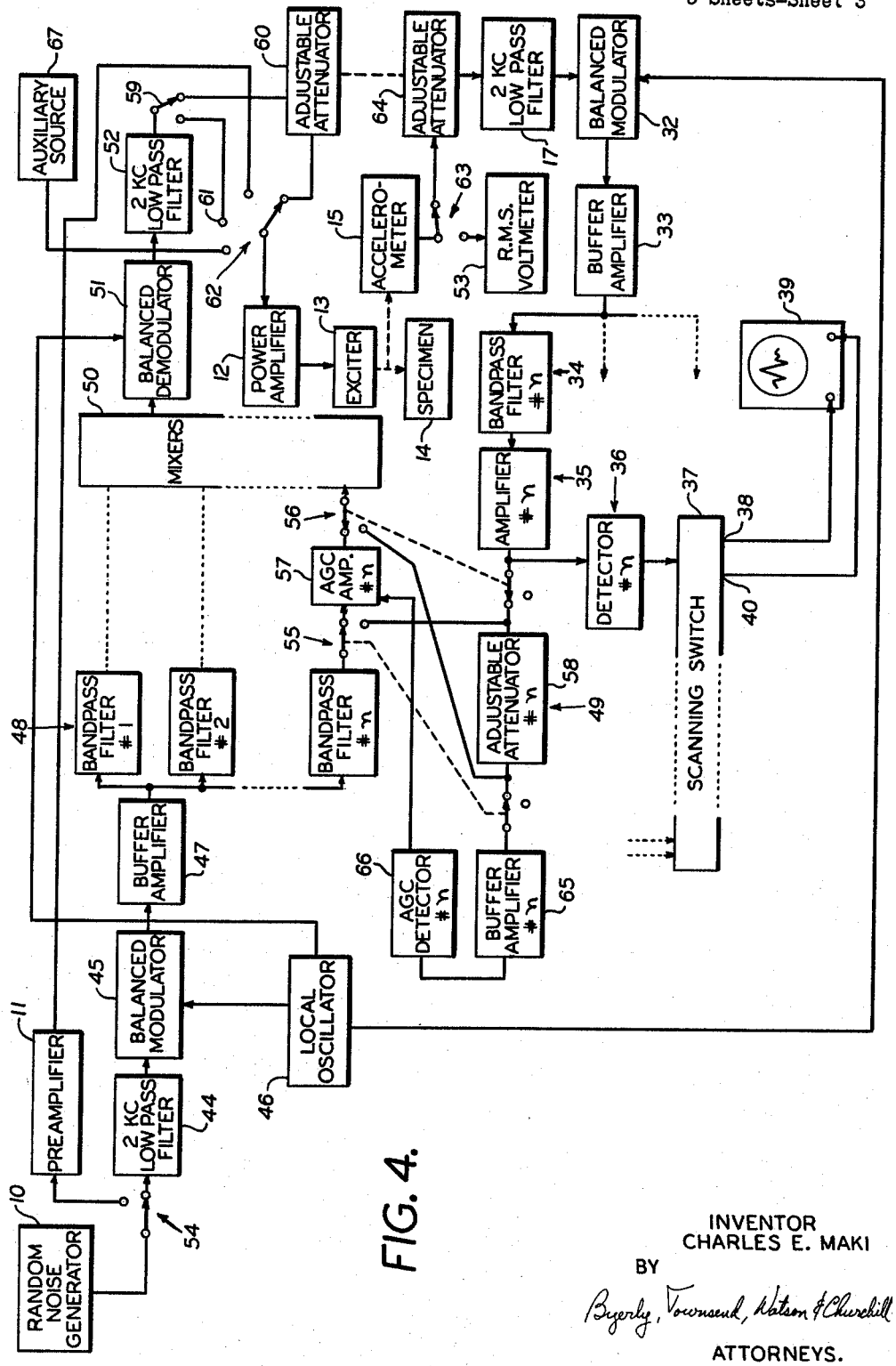

3,157,045
VIBRATION TESTING SYSTEM
Charles E. Maki, Branford, Conn., assignor to Textron Electronics, Inc., Providence, R.I., a corporation of Delaware
Filed Aug. 15, 1960, Ser. No. 49,546
22 Claims. (Cl. 73—71.6)

The present invention relates to vibration testing equipment and particularly to such equipment operating with random noise signals in the audio frequency range.

It has been discovered that a number of the spectacular failures of guided missiles in the past few years have been due to the effects of intense random vibrations existing in the missiles during launching. This has resulted in the development of equipment both to measure and to simulate this vibration in the laboratory.

In a random motion environment, the acceleration force varies randomly causing the energy represented by the motion to appear distributed over a band of frequencies. The power distribution is defined in terms of statistical quantities common to the field of random noise, i.e., in terms of the $(\text{acceleration})^2/\text{c.p.s.}$ which is called the acceleration spectral density further abbreviated ($g^2/\text{c.p.s.}$). This function is generally specified as the output of the vibration system as a function of frequency. When the acceleration spectral density of a random noise source is flat with respect to frequency, it is identified as "white" noise.

In addition to the spectral distribution of a random noise signal, amplitude variations exist which require probability theory to evaluate. It is a fair assumption that the amplitude distribution in a random vibration environment follows the Normal or Gaussian curve.

In a typical testing system a random noise generator drives the system input with a random voltage which is converted by suitable amplifiers and an electro-mechanical vibration exciter into a mechanical output. Generally it is required to shape the system response and control the spectrum of the output acceleration in accordance with a given set of specifications. A typical mechanical system can contain as many as five different types of resonances. Three of these types are of particular concern in random motion equipment. Thus, the exciter is characterized by both a low frequency electrical resonance and a high frequency axial resonance. To this is added the peak and notch phenomenon caused by resonances in the specimen attached to the exciter. In order to facilitate prediction of the output of the exciter it is necessary to introduce equalization to compensate for these resonant characteristics.

Various methods for equalization have been proposed heretofore, but all have various limitations. It is one of the purposes of the present invention to provide more versatile equalization than heretofore known.

In a given test system, the first problem in equalization is satisfactory analysis of the operating characteristics of the system. Heretofore, swept frequency techniques have been employed for this purpose but they are inherently slow. It is, therefore, a further purpose or object of the present invention to provide a system for spectrum analysis which is considerably more rapid in operation than pre-existing systems and which, in addition to performing system analysis for facilitating equalization, can be employed for extremely rapid direct representation or plotting of the spectral distribution of any random signal source. In fact, the present system offers as great as 500 times faster analysis than swept frequency systems with comparable fidelity.

After the operating characteristics of the system have been obtained it is necessary to translate them into appropriate adjustments of the system for equalization. Again this has been accomplished in the past by a swept frequency technique requiring independent measurements and manual adjustments to be made at each resonant frequency. Thus, a still further object of the present invention is to overcome the disadvantages of the pre-existing systems by providing a fully automatic system for both system analysis and equalization.

The foregoing objects are attained by providing in accordance with the present invenion a vibration testing system comprising a source of random noise signals in the audio frequency range having a given bandwidth, a mixing circuit, a first group of signal channels coupled between the source and the mixing circuit, the channels each having a frequency selective input for collectively dividing the signals of the given bandwidth into a a plurality of adjacent narrow frequency bands, a separate automatic gain control device in each of the channels between the corresponding frequency selective input and the mixing circuit, a vibration exciter, means for energizing the exciter with the output from the mixing circuit, an electro-mechanical transducer coupled to the exciter for providing a signal as a function of exciter operation, a second group of signal channels equal in number to the first group and each coupled between the output of the transducer and a gain controlling input of a different one of said gain control devices, each of the second group of channels having a frequency selective input for selecting the same narrow frequency band as carried by the associated channel in the first group, and an adjustable attenuator and detecting circuit in each of the channels of said second group between the frequency selective input thereof and the associated automatic gain control device.

By providing the system with appropriate switching mechanisms it is possible to use the same equipment for manual equalization, and/or for random wave spectral analysis in addition to automatic equalization.

The invention will be better understood as well as the many advantages thereof after reading the following detailed description of a presently preferred embodiment thereof with reference to the accompanying drawings in which:

FIG. 2 is a simplified electrical schematic diagram of the detector circuit employed in the system;

FIG. 3 is an electrical schematic block diagram of the system as set up for manual equalization; and FIG. 4 is an electrical schematic block diagram of an entire system operable either fully automatic or as shown in either FIG. 1 or 3.

Figure 1:
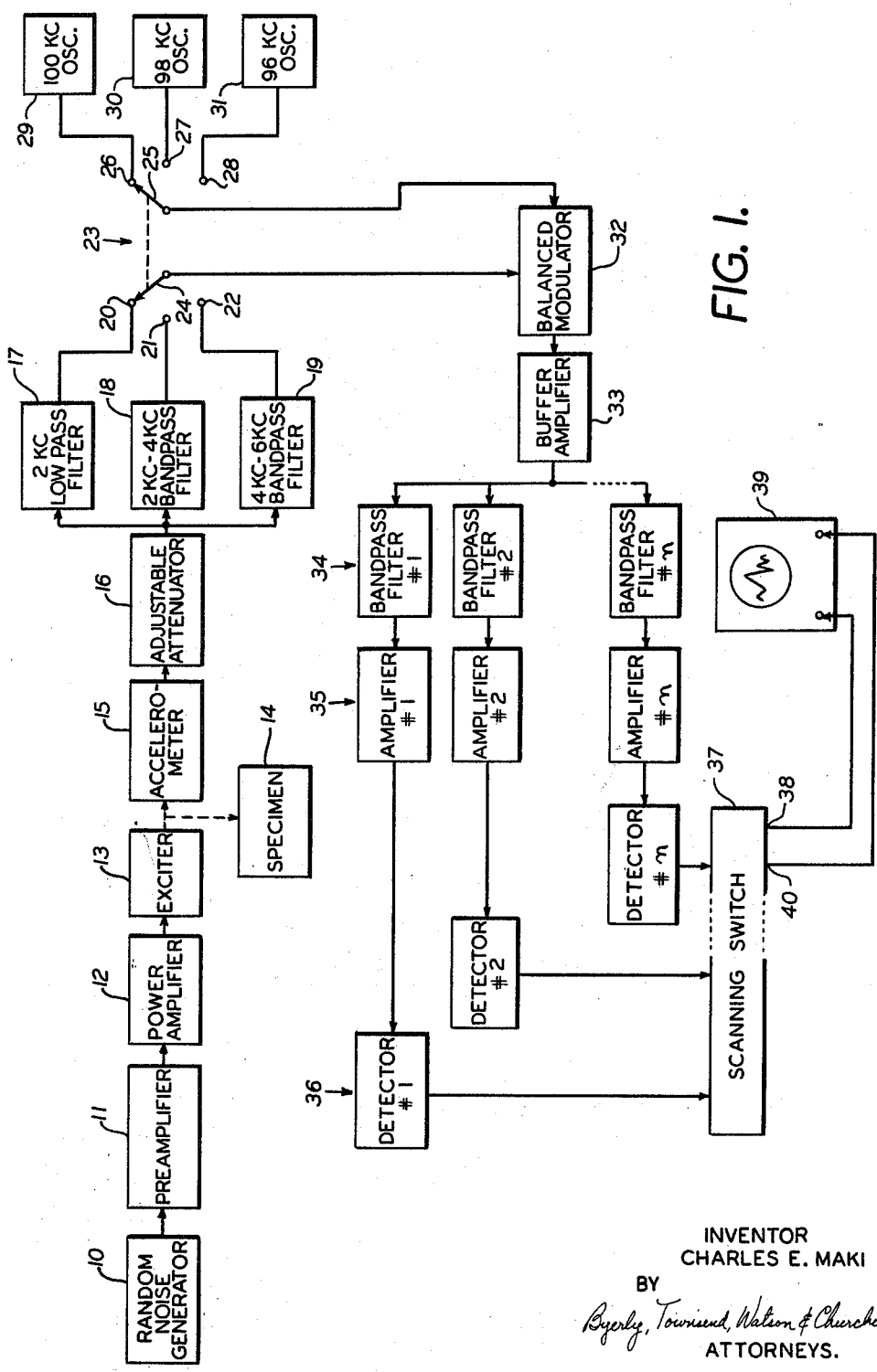
FIG. 1 is an electrical schematic block diagram of the system as set up for spectrum analysis.

Referring now to FIG. 1, the equipment required for analyzing spectral density will be considered first. It will be assumed that it is desired to analyze the overall operating characteristics of a vibration testing system operating with a random noise signal. Thus, a random noise generator 10 has its output coupled through a pre-amplifier 11 and power amplifier 12 to an electro-mechanical vibration exciter 13. The exciter is shown coupled mechanically to a specimen 14 undergoing test and to a crystal accelerometer 15.

A random noise generator such as the generator 10 provides an output containing signals of all frequencies within the band limitations of the device. One such generator that has been used has a bandwidth of 20 kc. in the audio range while others are available with the bandwidth restricted to 5 kc. In any case, depending upon the nature of the exciter 13 and the specifications for the test, the signals of interest may all fall between zero and 2 kc. or they may go as high as 6 kc. or higher. For the present, let it be assumed that all signals of interest lie between zero and 6 kc. As will appear hereinafter, it is convenient to divide the frequency spectrum into adjacent 2 kc. bands, analyzing each such band independently. Thus, the output of the accelerometer 15 is coupled through an adjustable attenuator 16 to three filters in parallel. The first filter, 17, is a low pass filter having a flat response from zero to 2 kc. which then falls off rapidly. The second filter, 18, is a bandpass filter having a substantially flat response between 2 kc. and 4 kc. while the third filter, 19, is a bandpass unit with a flat response between 4 kc. and 6 kc.

The output of each of the filters 17, 18 and 19 is coupled to a different fixed contact, 20, 21 and 22, respectively, of the double-pole three position switch 23. The fixed contacts 20, 21 and 22 are associated with a movable contact 24 which is ganged to the movable contact 25. The contact 25, in turn, is associated with three fixed contacts 26, 27, and 28, coupled, respectively, to three oscillator circuits 29, 30 and 31. It will be noted that oscillator 29 has an operating frequency of 100 kc. while the operating frequencies of oscillators 30 and 31 are 98 kc. and 96 kc., respectively.

With the switch 23 in the position shown in the drawing, the filter 17 and oscillator 29 are coupled to the appropriate inputs of a balanced modulator 32. The balanced modulator 32 is of the type which suppresses the carrier, in this case the 100 kc. signal from the oscillator 29. Thus, the output of the modulator 32 will contain only the upper and lower sidebands containing frequencies from 102 kc. down to almost 100 kc., and from 98 kc. up to close to 100 kc., depending upon the lowest frequency present in the output of the filter 17. It will be understood by those skilled in the art that the upper sideband frequencies at the output of the modulator 32 will lie in the same range for either of the other two positions of the switch 23. This is brought about by use of a lower frequency carrier, 98 kc. or 96 kc., with the higher frequency filter bands.

The output of the balanced modulator 32 is now passed through a suitable buffer amplifier 33 to a bank 34 of similar bandpass filters operating in parallel. For convenience only three filters are shown although it will be understood that there are sufficient filters to adequately cover the total band being investigated with acceptable fidelity.

Experience has demonstrated that the smallest resonance bandwidth typically encountered in a specimen mounted on a vibration exciter is about 100 c.p.s. As a consequence it will be found that sampling the entire frequency band in bandwidth increments of 25 c.p.s. will be adequate for providing a well defined picture of the spectral density. In the embodiment now being described the overall bandwidth supplied to the filter bank 34 is 2,000 c.p.s. Thus, 80 filters, each having a bandwidth of 25 c.p.s. and with uniformly spaced center frequencies, are required. That is, filter #1 will have a center frequency of 100,025 c.p.s., filter #2 will have a center frequency of 100,000 c.p.s., and so on until filter #80 which will have a center frequency of 102,000 c.p.s. The actual frequency band covered by these filters extends from about 100,012 c.p.s. to approximately 102,012 c.p.s.

Since it is not an absolute requirement that the band be divided into 80 parts or that the divisions be of equal bandwidth, the drawing designates the last filter generally as #$n$. The nature of the filters in the bank 34 will be described in further detail hereinafter.

The signals leaving the filters of the bank 34 are selected from the upper sidebands supplied by the modulator 32 while the lower sidebands are suppressed.

Each of the filters of the bank 34 is connected through an independent amplifier in an amplifier bank 35 and through a corresponding detector in the bank 36 to a scanning switch 37. The scanning switch 37 sequentially couples the output from the detectors of the bank 36 to a common output 38 which may be coupled, as shown, to control the vertical axis of a cathode ray oscilloscope 39. The horizontal axis of the oscilloscope is also coupled to the scanning switch over a separate connection 40, and in this manner a sweep voltage is applied to the oscilloscope in synchronism with the scanned outputs of the detector bank in order to produce on the oscilloscope a display representing a plot of acceleration density as a function of frequency. The synchronized sweep voltage may be derived over connection 40 directly from the scanning switch or supplied by an internal sweep generator which is synchronized externally over connection 40 with the scanning switch, all in well-known manner.

It might be thought that ideally a very large number of ideal filters with flat top responses and vertical skirts spaced so as to avoid gaps between the filters while also avoiding overlap would be required to provide a perfect analysis of the frequency spectrum. However, it is not presently known how to build filters which have an infinite slope at the skirts and which can be arranged adjacent one another with infinitesimal spacing. Improper arrangement of the filters can produce peak or notch characteristics conceivably more serious than those introduced by the test specimen.

Fortunately, it has been found that the use of ideal filters are not only unnecessary but actually undesirable. In the present invention each of the filters in the filter bank 34 consists of a 2-section magnetostrictive filter. Each section has a bandwidth at the −3 db point of approximately 17.8 c.p.s., and when added together out of phase both sections produce a composite bandwidth of 25 c.p.s. at −3 db. The Q of a single section is approximately 10,000 while the Q of the composite filter is somewhat greater than 5,000. Care should be taken that each adjacent composite filter is summed out of phase with its neighbor. By choosing 2-section composite filters having skirts with slopes less than infinite it is possible to add their outputs so as to produce a reasonably flat overall response.

The quantity desired to be measured is the R.M.S. (root mean square) magnitude of the signals. At first blush it would seem logical to employ a square law detector. However, it can be shown that such a detector requires an averaging network time constant on the order of 210 seconds in order to provide less than 2% error with 95% confidence between the actual output of the detector and the true mean value of the detected signal prior to filtering. On the other hand it has been discovered that a peak type detector can produce the same results, due to a fortuitous signal relationship, with an averaging nework time constant of only 2.5 seconds. That is, it has been observed that the output of each 2-section magnetostrictive filter consists of a narrow band signal of Gaussian amplitude distribution. For this reason it is possible to use a peak type detector for obtaining a signal proportional to the R.M.S. value of its input. This phenomenon holds true regardless of the nature of the random wave signals energizing the system so long as the pass bands of the filters in the filter bank 34 are narrow. 25 c.p.s. is considered a narrow pass band.

In FIG. 2 there is shown in simplified form the preferred detector circuit used in the detector bank 36 of FIG. 1. A crystal diode 41 shunts the input for rectifying the narrow band signal received from the corresponding filter in the filter bank. The output of diode 41 is connected through a resistor 42 and shunt capacitor 43 to the output for the detector. Resistor 42 and capacitor 43 form a low pass filter network and constitute the averaging network referred to previously. The time constant should be chosen with the maximum permissible error in mind, a longer time constant decreasing the error but increasing the analysis time.

Having analyzed the system response, the problem of equalization can be considered. For this purpose reference should be had to FIG. 3, wherein the same or similar parts as found in FIG. 1 are designated by the same reference numerals.

The random noise generator 10 now has its output fed through a low pass filter 44, having a substantially flat pass band from zero to 2 kc., to a balanced modulator 45 supplied with a carrier signal by the local oscillator 46. The low pass filter 44 eliminates all undesired frequencies in order that subsequent amplifier stages will not be overloaded and can be efficiently designed. The balanced modulator 45 may be identical to modulator 32 in FIG. 1 and provide a suppressed carrier output. Conveniently, the local oscillator 46 is arranged to operate at 100 kc. Thus, the sideband output of the modulator 45 is passed through a buffer amplifier 47 to a bank of narrow band filters 48. The filters in the bank 48 may have identical characteristics to the corresponding filters in the bank 34 of FIG. 1. That is, the 2 kc. band of test signals can be divided into 80 equal narrow bands each with a width of 25 c.p.s.

The selected output of each filter in the bank 48 is coupled through a separate adjustable attenuator in an attenuator bank 49 to a mixing circuit or network 50. If the mixing circuit 50 should consist of more than one intermediate channel, care must be taken that the phase shift is the same throughout. It will be understood that the mixer output will include signals within the frequency range of approximately 100,012 c.p.s to 102,012 c.p.s.

The foregoing output from the mixing circuit 50 is fed to a balanced demodulator 51 which may be similar to the modulator 45 and which is supplied with signals from the same local oscillator 46, as shown. Demodulator 51 provides sideband signals having frequencies from 12 to 2012 c.p.s. and from 200,012 to 202,012 c.p.s. The lower sideband, i.e., the original audio frequency random noise signal, is recovered by passing the signals through a 2 kc. low pass filter 52. This filter may have the same characteristics as filter 44. The output of filter 52 is then fed through the power amplifier 12 to the exciter 13 for shaking the specimen 14. An accelerometer 15 coupled to the exciter 13 may have its output coupled to an R.M.S. voltmeter or Spectral Density Voltmeter 53 for determining the overall R.M.S. level of the excitation.

In order to provide satisfactory shaping of the frequency spectrum, each of the adjustable attenuators in the bank 49 may be independently adjusted so as to control the power or energy level in any 25 c.p.s. band. Since it is convenient to calibrate the attenuators in terms of db, the units should have a logarithmic characteristic. Logarithmic potentiometers have proven quite satisfactory for the purpose.

By using the spectrum analyzer circuit of FIG. 1 to observe the output from the accelerometer 15 in place of the R.M.S. voltmeter 53 in FIG. 3, it is possible to manually adjust each of the attenuators in the attenuator bank 49 to provide a "white" response or any other overall response as desired.

In FIG. 4, the circuits of FIGS. 1 and 3 have been combined to provide selectively independent operation or combined automatic operation. Again, the same reference numerals are used to designate the same or similar parts appearing in the other figures.

The random noise generator 10 is now coupled through a switch 54 selectively to the preamplifier 11 or the 2 kc. low pass filter 44. With switch 54 in the position shown, the signals are fed through filter 44, balanced modulator 45 and buffer amplifier 47 to the filter bank 48. Since each of the channels between the filter in bank 48 and the mixers 50 is similar it will suffice to describe only one channel. Thus, filter #n is coupled, depending upon the positions of ganged switches 55 and 56, either through an AGC (automatic gain control) amplifier 57 or through the adjustable attenuator 58 from bank 49 to the mixers 50. With switches 55 and 56 in the positions shown in the drawing, the filter bank 48 is connected through the AGC amplifiers to the mixers, it being understood that the switches for all of the other 79 channels are ganged with switches 55 and 56 so that the entire attenuator bank 49 can be substituted virtually as a unit for a bank of AGC amplifiers.

The output of the mixers 50 is fed through the balanced demodulator 51 and the 2 kc. low pass filter 52 through a switch 59 selectively to an adjustable attenuator 60 or to a fixed contact 61 of a multiposition switch 62. As shown in the drawing the switch 59 is connecting the filter 52 to the attenuator 60 while the switch 62 is connecting the output of the attenuator 60 to the power amplifier 12.

As previously described, power amplifier 12 feeds exciter 13 which drives specimen 14 and the accelerometer 15. Another switch, 63, selectively couples the output of the accelerometer to the R.M.S. voltmeter 53 or through an adjustable attenuator 64 to the low pass filter 17 already described with reference to FIG. 1. It should be noted that the attenuators 60 and 64 are ganged together for reciprocal operation such that the overall gain from low pass filter 52 to low pass filter 17 remains constant while the signal level to the exciter may be varied.

The output of filter 17 passes through balanced modulator 32 and buffer amplifier 33 to the bandpass filter bank 34. For proper operation the characteristics of the bank 34 should be as closely identical to those of bank 48 as possible.

One output path from each of the filters in bank 34 is the same as that described with reference to FIG. 1, viz. amplifier bank 35 feeding scanning switch 37 through detector bank 36. The control of oscilloscope 39 remains the same. However, each of the amplifiers in bank 35 is additionally coupled selectably through ganged switch 56 to the corresponding adjustable attenuator in bank 49. This is the case for the switch position illustrated in the drawing. Also, for the illustrated position of switch 55, the output of attenuator 58 is fed through a corresponding buffer amplifier 65 and AGC detector 66 to control the gain of AGC amplifier 57. Detector 66 may be similar in construction and operation to the detector described with reference to FIG. 2. It should be understood that a bank of amplifiers 65 and AGC detectors 66 are provided to serve each of the 80 channels.

Before considering the operation of the circuit it will be seen that power amplifier 12 can be connected by changing the position of switch 62 either to the preamplifier 11, the low pass filter 52 (assuming switch 59 is also actuated) or any other source of excitation such as auxiliary source 67.

With all of the switches in the positions shown in the drawing the apparatus is set for automatic operation. The acceleration or output of the exciter 13 will be picked up by the accelerometer 15 and limited to the zero to 2 kc. band by the filter 17. It is assumed that the oscillator 46 is operating at 100 kc. After the signals are boosted in frequency by modulator 32 and suitably amplified they are divided into the 80 narrow band channels by the filter bank 34. The signals in each of the channels can have their relative level controlled by relative adjustment of the attenuators in bank 49. The signals as adjusted then are detected to provide a D.C. voltage for controlling the gain in the corresponding channel between filter bank 48 and mixers 50. In order to ensure stability in the feedback control loops the time constant of the averaging network in detector 66 as well as the others in the same bank should be somewhat longer, say 25 seconds, than the time constant employed in bank 36 for the analyzer section.

For further flexibility in operation of the system of FIG. 4 a switching mechanism (not shown) can be employed to change the frequency of the carrier wave supplied to the balanced modulator 32 while making an appropriate substitution for filter 17. The arrangement may be similar to that shown in FIG. 1. However, if the thus extended range of the analyzer is to be employed on automatic operation, similar changes will have to be made in the carrier frequency supplied to modulator 45 and demodulator 51 as well as to the pass bands of filters 44 and 52.

From the foregoing it will be seen that a set of filters, e.g., 80, is used to divide a random noise input spectrum of an audio system into 25 c.p.s. increments. An identical set of filters operating as a spectrum analyzer provides a similar function on the system output. By means of an automatic feedback type of regulating system each of the channels is independently coupled into a closed loop. This provides automatic compensation and equalization.

It should be understood that additional amplification and other refinements well known to those skilled in the art may be incorporated in the actual system but form no part of the present invention. Consequently, details thereof have been omitted.

Having described the invention in terms of the presently preferred embodiment thereof, it will be apparent to those skilled in the art that numerous changes may be made therein without departing from the true spirit thereof as defined in the appended claims.

What is claimed is:

1. A vibration testing system comprising a source of random noise signals in the audio frequency range having a given bandwidth, a mixing circuit, a first group of signal channels coupled between said source and said mixing circuit, said channels each having a frequency selective input for collectively dividing the signals of said given bandwidth into a plurality of adjacent narrow frequency bands, a separate automatic gain control device in each of said channels between the corresponding frequency selective input and said mixing circuit, a vibration exciter, means for energizing said exciter with the output from said mixing circuit, an electro-mechanical transducer coupled to said exciter for providing a signal as a function of exciter operation, a second group of signal channels equal in number to said first group and each coupled between the output of said transducer and a gain controlling input of a different one of said gain control devices, each of said second group of channels having a frequency selective input for selecting the same narrow frequency band as carried by the associated channel in said first group, and an adjustable attenuator and detecting circuit in each of the channels of said second group between the frequency selective input thereof and the associated automatic gain control device.

2. A vibration testing system according to claim 1, wherein said detecting circuits are of the peak type having an averaging network with a time constant chosen to provide an output proportional to the true R.M.S. voltage of a narrow band random signal having a Gaussian amplitude distribution within the audio frequency range corresponding to the respective channel.

3. A vibration testing system according to claim 1, further comprising means coupled to said second group of channels for providing a visual plot of the spectral density over said given bandwidth.

4. A vibration testing system according to claim 3, wherein said means for providing a visual plot comprises a further detecting circuit coupled to each of the channels of said second group before the adjustable attenuators, a scanning switch for sequentially sampling the output signals of each of said further detecting circuits and supplying the sampled signals in timed sequence to a common output, visual plotting means coupled to said common output, and means for synchronizing the time base of said plotting means with said switch.

5. A vibration testing system according to claim 4, wherein said further detecting circuits are of the peak type having an averaging network with a time constant chosen to provide an output proportional to the true R.M.S. voltage of a narrow band random signal having a Gaussian amplitude distribution within the audio frequency range corresponding to the respective channel.

6. A vibration testing system according to claim 1, wherein each of said frequency selective inputs comprises a bandpass filter with identical bandwidths and having a Q on the order of 5,000.

7. A vibration testing system according to claim 1, further comprising frequency changing means coupled before said channels of said first and second groups and after said mixing circuit for causing the channel signal frequencies to lie above the audio frequency range while maintaining the input to said exciter within said audio frequency range.

8. A vibration testing system according to claim 1, further comprising switching means for selectably removing said adjustable attenuators from the channels of said second group and substituting them for the corresponding automatic gain control in the channels of the first group.

9. A vibration testing system according to claim 8, further comprising means coupled to said second group of channels for providing a visual plot of the spectral density over said given bandwidth.

10. A vibration testing system according to claim 1, further comprising a pair of adjustable attenuators ganged for reciprocal operation, one of said pair being coupled between said mixing circuit and said exciter, the other being coupled between said transducer and said second group of channels.

11. A vibration testing system according to claim 1, further comprising selectable circuit switching means coupled between said source and said exciter for bypassing said first group of channels.

12. A vibration testing system comprising a source of random noise signals in the audio frequency range having a given bandwidth, a mixing circuit, a group of signal channels coupled between said source and said mixing circuit, frequency changing means coupled before said signal channel and after said mixing circuit for causing the channel signal frequencies to lie above the audio frequency range while providing an output within said given audio frequency bandwidth, said channels each having a frequency selective input for collectively dividing the signals reaching said channels into a plurality of adjacent narrow frequency bands, a separate adjustable attenuator in each of said channels between the corresponding frequency selective input and said mixing circuit, a vibration exciter, means for energizing said exciter with said output from said frequency changing means, and means for monitoring the operation of the exciter.

13. A vibration testing system according to claim 12, wherein each of said frequency selective inputs comprises a bandpass filter with identical bandwidths and having a Q on the order of 5,000.

14. A vibration testing system comprising a source of random noise signals in the audio frequency range having a given bandwidth, a vibration exciter, means for energizing said exciter with the output from said source, an electro-mechanical transducer coupled to said exciter for providing a signal as a function of exciter operation, a group of signal channels each having an input, frequency changing means coupling the output of said transducer to said inputs of the channels, said frequency changing means causing the channel signal frequencies to lie above the audio frequency range, each of said channel inputs being frequency selective for collectively dividing the signals reaching said input into a plurality of adjacent narrow frequency bands, a peak type detecting circuit in each of the channels coupled to the corresponding frequency selective input and each having an averaging network with a time constant for providing an output proportional to the R.M.S. voltage of the modulation component carried in said channels, and means coupled to said detecting circuits for providing a visual plot of the spectral density over said given bandwidth.

15. A vibration testing system according to claim 14, wherein said means for providing a visual plot comprises a scanning switch for sequentially sampling the signals from each of said detecting circuits and supplying them in timed sequence to a common output, visual plotting means coupled to said output and having a time base, and means for synchronizing the time base of said plotting means with said switch.

16. A vibration testing system comprising a source of random noise signals in the audio frequency range having a given bandwidth, a mixing circuit, a first group of signal channels, modulating means, a source of carrier signals having a frequency above said audio frequency range, both of said signal sources being coupled to said modulating means for providing a modulated carrier signal, said first group of channels being coupled between said modulating means and said mixing circuit, each channel having a frequency selective input for collectively dividing the signals of at least one sideband of said modulated carrier signal into a plurality of adjacent narrow frequency bands, a separate automatic gain control device in each of said channels between the corresponding frequency selective input and said mixing circuit, a vibration exciter, means coupled both to said source of carrier signals and to said mixing circuit for demodulating the signals received from the latter, means for energizing said exciter with the output from said modulating means, an electromechanical transducer coupled to said exciter for providing a signal as a function of exciter operation, a second modulating means similar to said first and coupled both to said source of carrier signals and to said transducer for receiving the signals therefrom and providing a second modulated carrier signal, a second group of signal channels equal in number to said first group and each coupled between the output of said second modulating means and a gain controlling input of a different one of said gain control devices, each of said second group of channels having a frequency selective input for selecting the same narrow frequency band as carried by the associated channel in said first group, and an adjustable attenuator and detecting circuit in each of the channels of said second group between the frequency selective input thereof and the associated automatic gain control device, said detecting circuits each having an averaging network with a time constant chosen to provide an output proportional to the true R.M.S. voltage of the modulation component carried in the respective channels of the second group.

17. Vibration testing equipment for manual equalization comprising a modulator, means for supplying said modulator with random noise signals in the audio frequency range, a source of carrier signals having a frequency above the audio frequency range, said source being coupled to said modulator for providing a modulated carrier signal, mixing and demodulating means, a group of signal channels coupled between said modulator on the one hand and said mixing and demodulating means on the other hand, each channel having a frequency selective input for collectively dividing the signals of at least one sideband of said modulated carrier signal into a plurality of adjacent narrow frequency bands, a separate manually adjustable attenuator device in each of said channels between the corresponding frequency selective input and said mixing and demodulating means, means coupling said source of carrier signals to said mixing and demodulating means, and means for supplying the output of said last mentioned means to equipment for energizing a vibration exciter.

18. Vibration testing equipment according to claim 17, wherein said frequency selective input for each channel comprises a separate magnetostrictive filter device.

19. Vibration testing equipment according to claim 18, wherein each of said filter devices consists of a 2-section magnetostrictive filter having a bandwidth of 25 c.p.s. at —3 db.

20. Vibration testing equipment according to claim 17, wherein each of said attenuator devices has a logarithmic characteristic.

21. Vibration testing equipment according to claim 20, wherein said frequency selective input for each channel comprises a separate magnetostrictive filter device.

22. Vibration testing equipment comprising modulating means, means for supplying said modulating means with random noise signals in the audio frequency range having a given bandwidth, a source of carrier signals having a frequency above said audio frequency range, said source being coupled to said modulating means for providing a modulated carrier signal, a mixing circuit, a first group of signal channels coupled between said modulating means and said mixing circuit, each channel having a frequency selective input for collectively dividing the signals of at least one sideband of said modulated carrier signal into a plurality of adjacent narrow frequency bands, a separate automatic gain control device in each of said channels between the corresponding frequency selective input and said mixing circuit, means coupled both to said source of carrier signals and to said mixing circuit for demodulating the signals received from the latter, means for coupling the output from said demodulating means to equipment for energizing a vibration exciter, means for receiving a signal representative of exciter operation, a second modulating means similar to said first and coupled both to said source of carrier signals and to said last mentioned means for receiving the signals therefrom and providing a second modulated carrier signal, a second group of signal channels equal in number to said first group and each coupled between the output of said second modulating means and a gain controlling input of a different one of said gain control devices, each of said second group of channels having a frequency selective input for selecting the same narrow frequency band as carried by the associated channel in said first group, and an adjustable attenuator and detecting circuit in each of the channels of said second group between the frequency selective input thereof and the associated automatic gain control device, said detecting circuits each having an averaging network with a time constant chosen to provide an output proportional to the true R.M.S. voltage of the modulation component carried in the respective channels of the second group.

References Cited in the file of this patent

UNITED STATES PATENTS

| | | |
|---|---|---|
| 2,468,648 | Abbott et al. | Apr. 26, 1949 |
| 3,015,949 | Arnold | Jan. 9, 1962 |

OTHER REFERENCES

Pages 6 and 7, MB Electronics, vol. 5, No. 3, June 1959, "Random Band Equalization Techniques," by G. B. Booth.

Page 9, MB Electronics, vol. 5, No. 4, August 1959, "Automatic Spectrum Equalization for Random Motion Testing," by Charles E. Maki.

UNITED STATES PATENT OFFICE
CERTIFICATE OF CORRECTION

Patent No. 3,157,045                                November 17, 1964

Charles E. Maki

It is hereby certified that error appears in the above numbered patent requiring correction and that the said Letters Patent should read as corrected below.

Column 2, line 9, for "invenion" read -- invention --; column 3, line 56, for "100,000" read -- 100,050 --; column 4, line 48, for "nework" read -- network --; column 9, line 26, for "modulating" read -- demodulating --; column 10, lines 44 and 45, for "associted" read -- associated --.

Signed and sealed this 13th day of April 1965.

(SEAL)
Attest:

ERNEST W. SWIDER                                EDWARD J. BRENNER
Attesting Officer                                    Commissioner of Patents